United States Patent Office

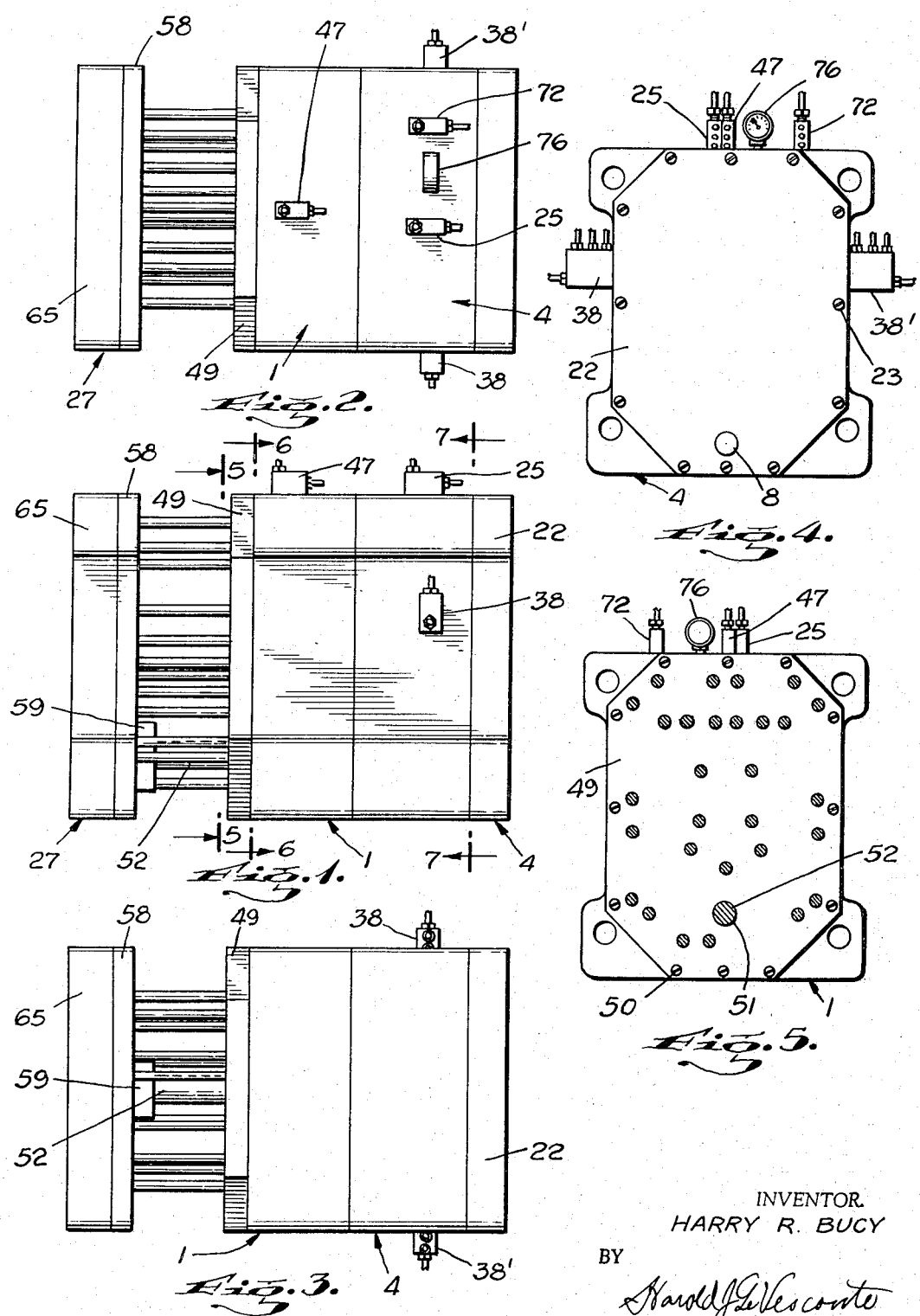

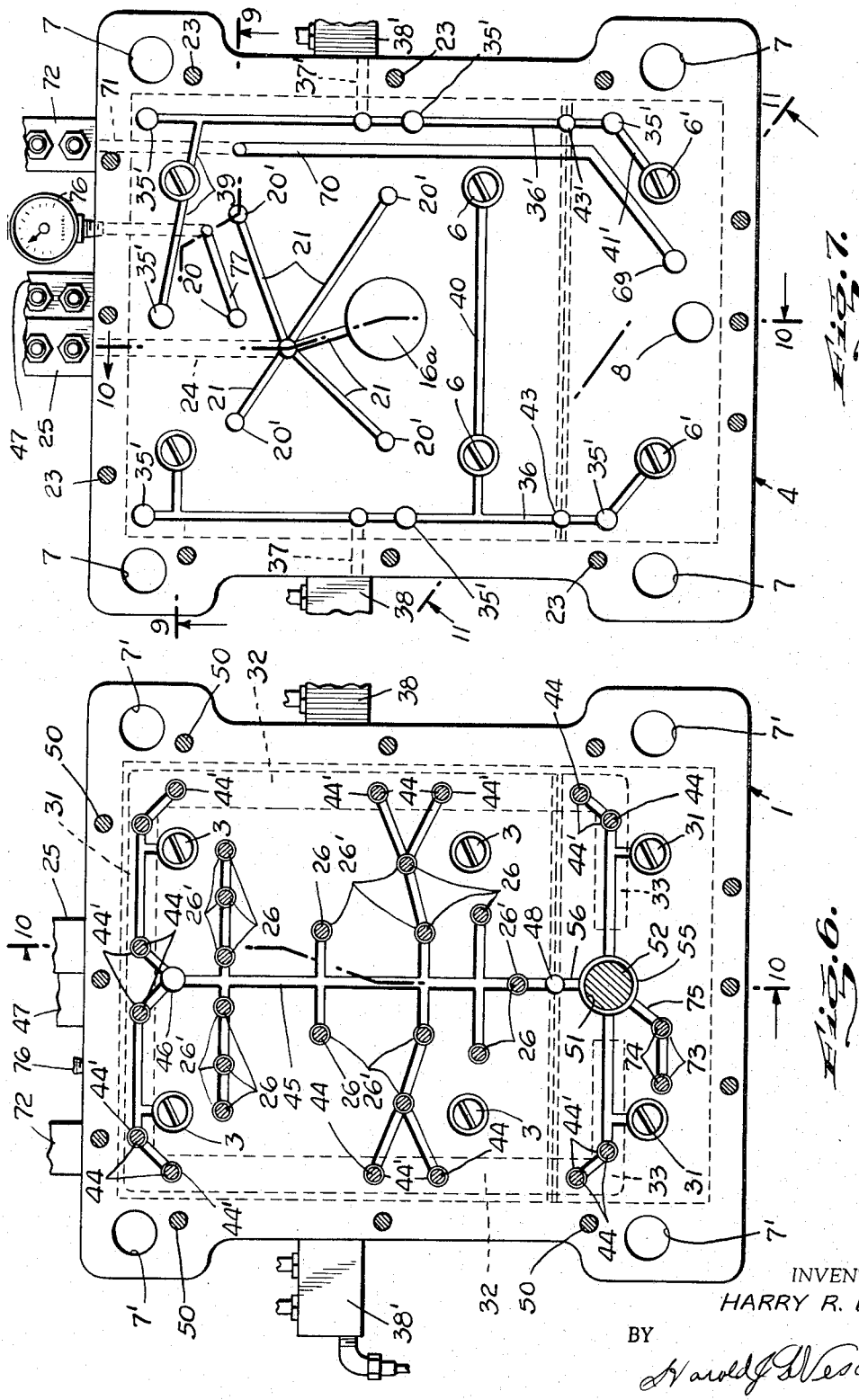

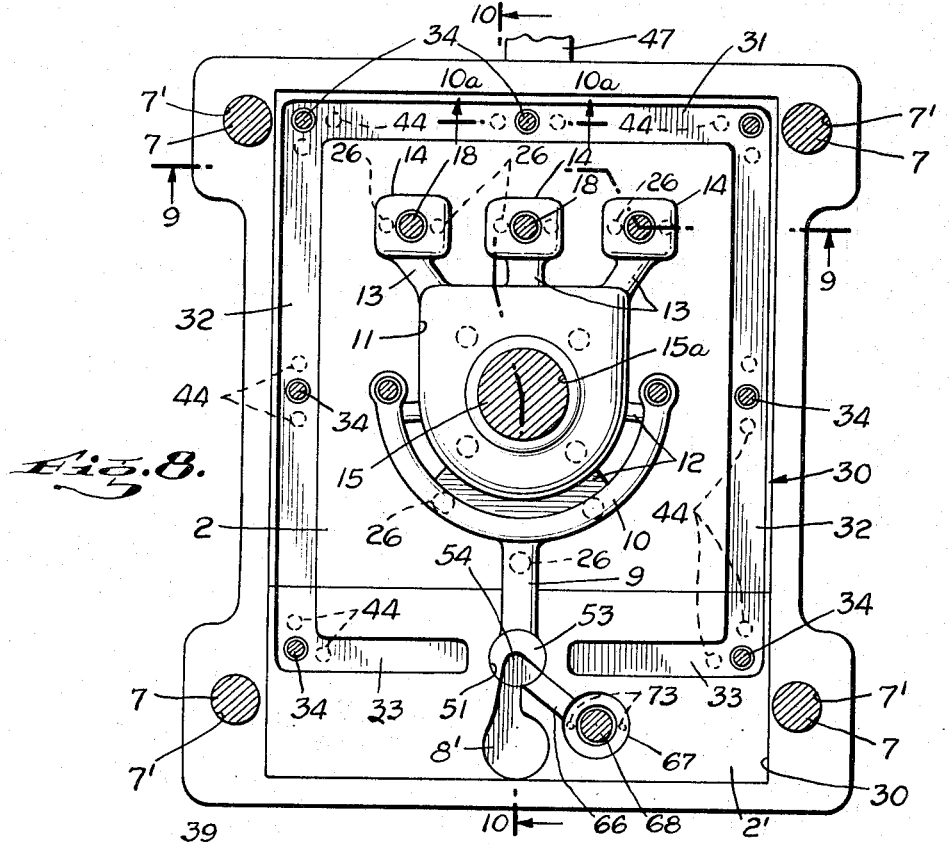
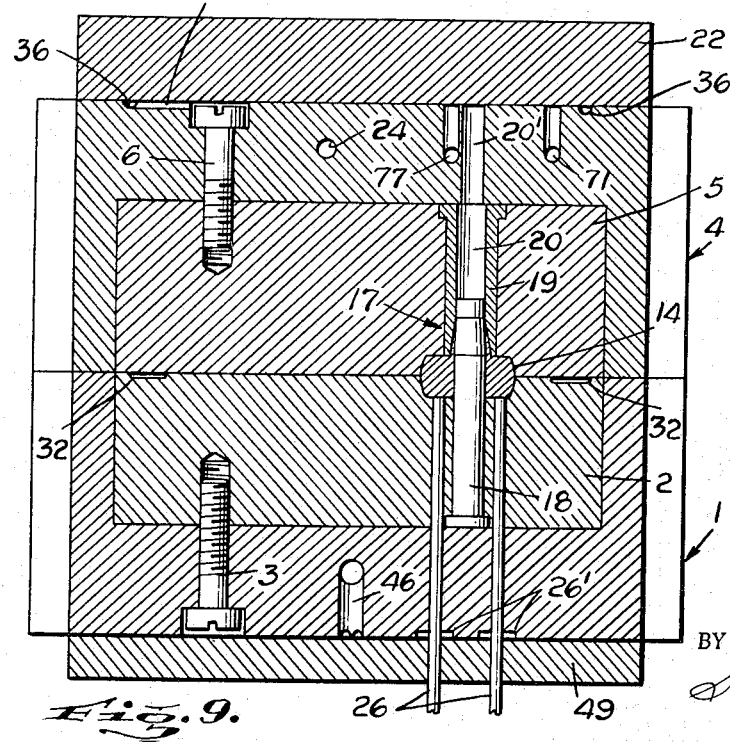
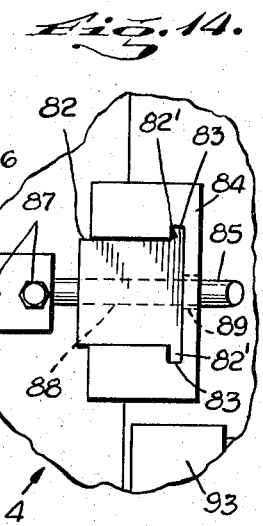

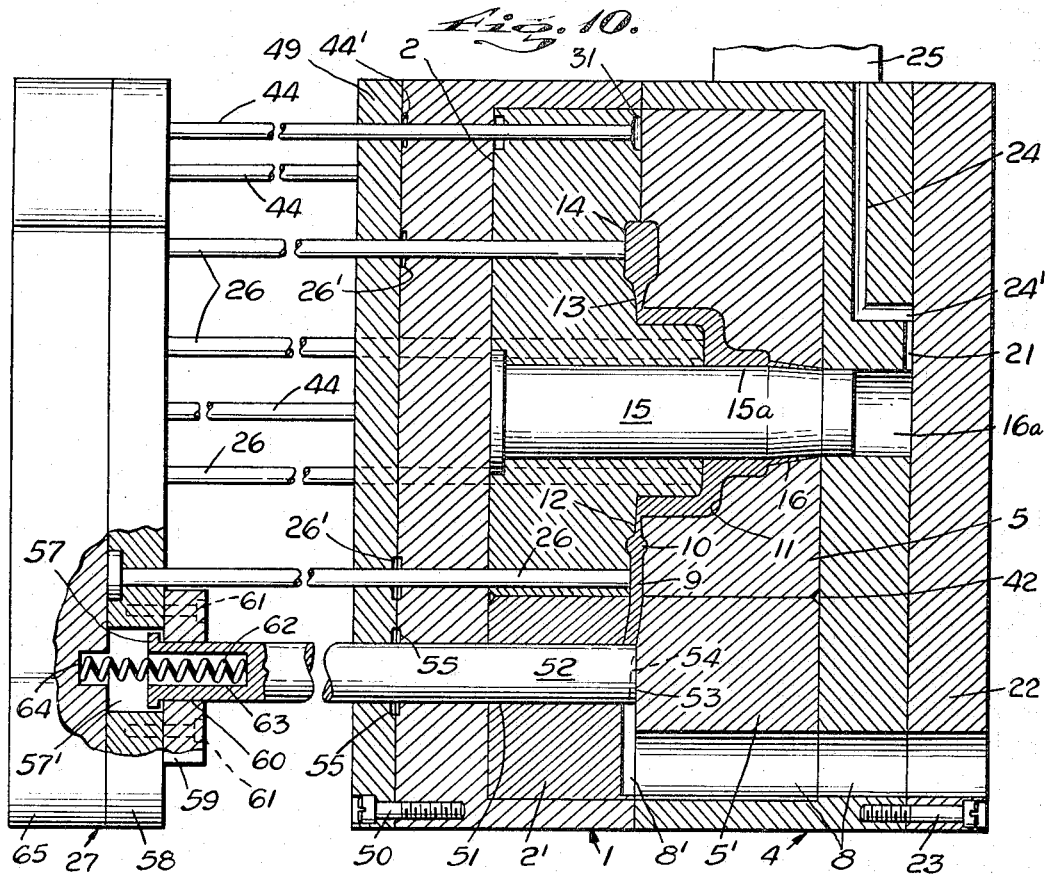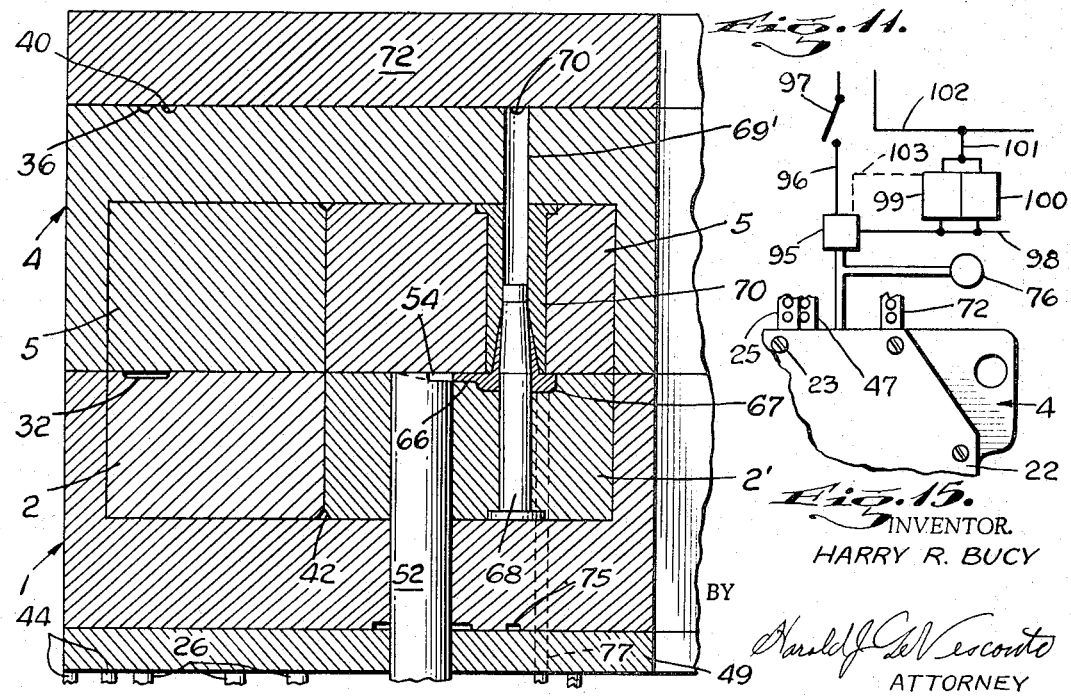

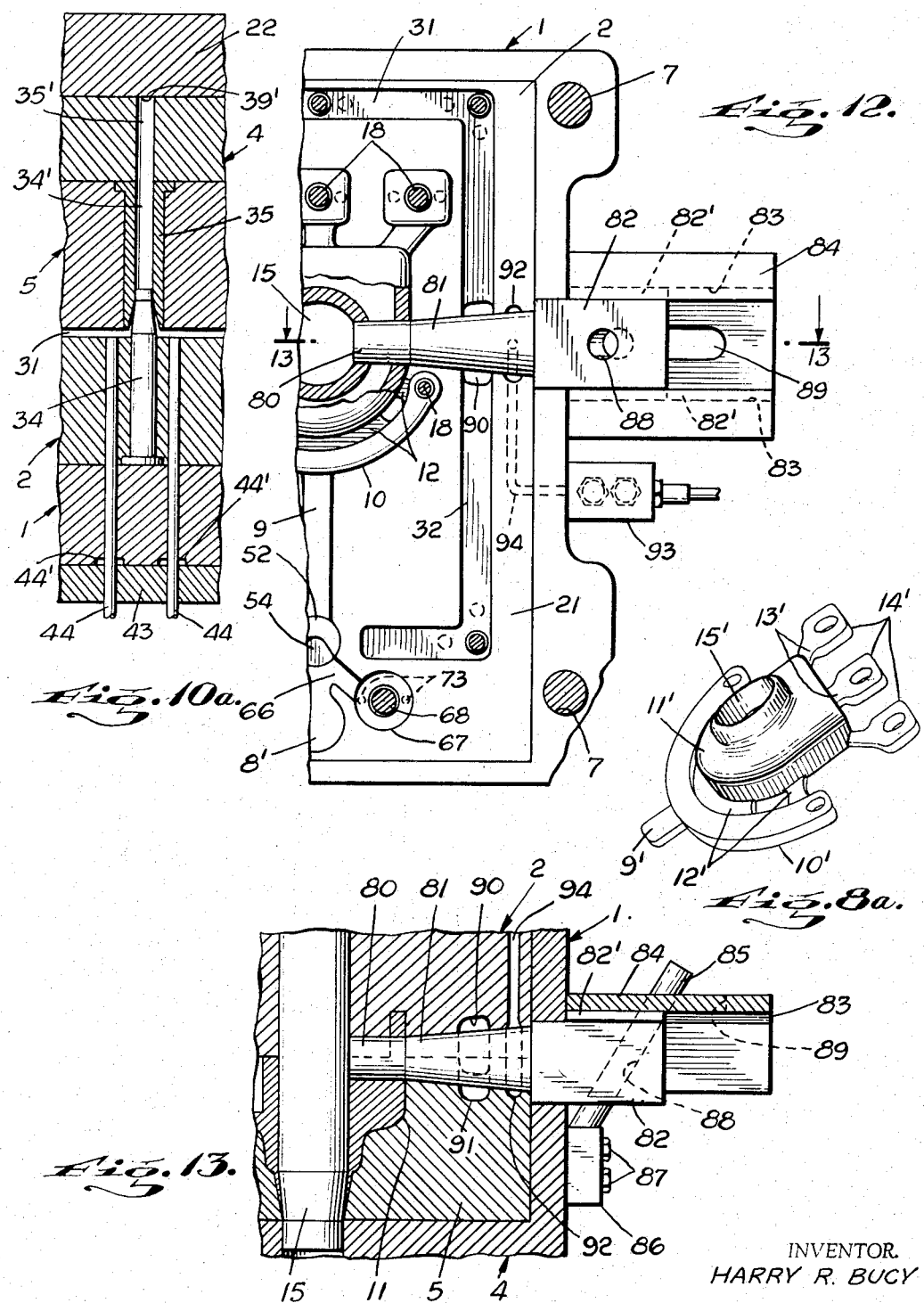

3,357,057
Patented Dec. 12, 1967

3,357,057
MOLD FOR PRESSURE INJECTED MATERIAL
Harry R. Bucy, 550 N. Brighton St.,
Burbank, Calif. 91506
Filed Oct. 15, 1965, Ser. No. 496,368
20 Claims. (Cl. 18—42)

This invention relates to the arts of pressure die casting and injection molding of plastics. Both of these arts involve the injection of molten materials into one or more cavities formed in the meeting faces of the halves of a mold which are held in juxtaposed position by sufficiently high pressure to withstand the high pressure imposed on the injected molten material. Regardless of the volumetric capacity of the mold cavity, the filling thereof is achieved in a very short time. The injection of the material into the mold cavity is termed a "shot" and die casting of metal, the time for thus making a shot is only a small fraction of a second and even in the slower flowing molten plastic material the corresponding time of making a shot seldom, if ever, exceeds about two or three seconds.

Heretofore, the entering material has had to displace the air in the mold cavity and the usual manner for allowing the entrapped air to escape is by the formation of one or more shallow grooves in the meeting faces of the mold halves leading from the mold cavity to the outer surface through which the air and gas might escape. This is described in the book entitled, "Die Casting," by H. H. Doehler, copyright 1951, which states at page 84:

"All dies must be properly vented with means for the escape of air in the die impression prior to the entry of the metal. If suitable escape channels are not provided, the air may be trapped in the casting, giving rise not only to porous castings but also to blistering of the casting surface.

Venting is usually accomplished by the use of small channels of about 0.005 to .006-in. thickness on the parting line of the die and at locations most likely to cause entrapment of air. In addition to such channels, it is common practice to place draw pockets or overflows, which essentially are small cavities properly disposed around the casting impression to provide additional escape areas."

Almost invariably, the stationary or ejection half of the mold is provided with pins which dislodge the form casting or molding and these pins are known as ejector pins. In the dies or mold heretofore usually employed, as the molten material enters the mold cavity, some of the air is forced out through the clearance between these ejector pins and the bores in which they reciprocate. This provides an additional means for allowing air to escape from the mold cavity.

Numerous efforts have been made to evacuate the mold cavity in advance of the entry of the molten material and these efforts, for the most part, have been directed to enclosing the mold within a housing or shroud which is evacuated in the hope by so doing the mold cavity will be similarly evacuated. Since, however, the mold is enclosed within this shroud, the operator has no way of knowing whether or not the mold is properly closed or whether the cavity is evacuated. If, for example, the vents previously referred to (and they must be employed) happen to be even partially plugged up, the space externally of the mold but within the shroud may have been evacuated while the mold cavity is only partially and perhaps not at all evacuated. Again if dirt or some obstruction should be on the meeting surface of one of the mold halves holding them slightly separated, the shot may project the material in a wide flash between the mold surfaces losing a casting and causing needless waste of time and material. This means of attempting to evacuate a mold cavity, while taught in the patent art, has never been deemed commercially feasible by the industry as a whole.

My prior Patent No. 3,108,339 granted Oct. 8, 1963, as well as my co-pending applications, Ser. No. 318,963, filed Oct. 25, 1963, now Patent No. 3,266,098 and Ser. No. 322,772, filed Nov. 12, 1963, now abandoned, have provided the first advances over this older venting means that has proven commercially practical. For the first time in the art, so far as I am aware, the integrity of the meeting faces of the mold halves is preserved and the interruption of these faces by the said side vents heretofore thought to be necessary has been eliminated.

The use of pressure die castings for structural element in which uniformity of strength and absence from flaws is a critical factor has heretofore been handicapped by the fact that the existence of internal flaws due to entrapped air and gas have been ascertainable only by the presence of surface blemishes or through costly X-ray and fluoroscopic examination. An important advantage of the present invention lies in the fact that not only is it possible to evacuate a mold cavity as a prior incident to the introduction of the molten material, but also, due to the fact that the extent of the evacuation is capable of being ascertainable and observable from the exterior of the mold, the said extent of evacuation can be employed both to initiate the injection of molten material and to effect the recording of the vacuum existing at the time of the "shot" as well as registering the number of the shot on a counting device. With this information available, each casting may be identified with the record of the vacuum prevailing at the time it was made by applying the number assigned by the counting device to the individual castings with the result that defective castings can be eliminated and those castings which are at least doubtful processed through X-ray or comparable examination while those castings which were formed in the presence of a predetermined extent of evacuation of the mold cavity may be automatically presumed to be good castings.

Molds embodying the principles of the said patent and the said co-pending applications are immeasurably better than anything heretofore known in the art and the principal objective of the present invention is directed to the provision of a still further advance in mold evacuation through the medium of a novel sealing means surrounding the mold cavity at the meeting faces of the mold halves and at every point at which there is any communication whatever between atmosphere and the mold cavity through which air might enter as the mold cavity is being evacuated and thus by the said novel sealing action insure the still more complete evacuation of the mold cavity.

Another object of the invention is to provide a means for sealing a mold cavity against the entrance of air while the cavity is being evacuated through means also capable of being incorporated in existing molds.

A further object of the invention is to provide a mold sealing means for molds receiving molten material under pressure which is operative to prevent the entrance of air to the mold cavity through the clearances between the mold and the relatively moving parts of the mold as, for example, the retractable core elements or ejector pin.

Still another object of the invention is the provision in molds for die casting of metals and injecting molding of plastics having mold cavity evacuating means in communication with the mold cavity at a point or points other than the meeting faces of the dies comprising the molds, of means for establishing zones of vacuum around all points having relatively moving parts between which air may enter the mold cavity while it is being evacuated.

A still further object of the invention is to provide in a mold for die casting or injection molding of plastics, a mold sealing means effective to establish a zone of vacuum around the mold cavity and separate zones of vacuum surrounding portions of relatively moving surfaces of relatively moving parts in either mold half together with other means for separately evacuating the mold cavity.

Still another object of the invention is to provide in a die casting mold or a mold for injection of plastics having a runner channel, means normally holding the runner channel closed which is opened only by pressure of the injected molten material.

A still further object of the invention is to provide in molds for die casting an injection molding of plastic means for evacuating air from the runner channel of the mold prior to or coincident with the entry of molten material therein.

Still another object of the invention is to provide a mold construction for pressure die casting and plastic injection molding machines in which the mold, per se, includes both parting line sealing means and cavity evacuating means whereby the molds may be used in conventional molding and casting machines without the necessity of adding mold covering shrouds, vacuum pump and tank apparatus, or other special equipment heretofore believed to be necessary.

Still another object of the invention is to provide a mold having a cavity capable of evacuation as set forth in the preceding objectives and in which the said extent of evacuation is employed to initiate the introduction of molten material into the mold cavity.

A still further object of the invention is to provide a mold having a cavity capable of evacuation as set forth in the preceding objectives and in which a means responsive to a predetermined extent or degree of evacuation which initiates the introduction of molten material, serves additionally, to institute actuation of a means which records the said degree of evacuation at which the molten material was introduced and/or a counting means displaying a number associated with the said recording and which can be applied to the casting produced whereby each casting produced can be compared with the machine record of the vacuum conditions prevailing in the mold at the time the casting was made.

With the foregoing objects in view, together with such additional objects and advantages as may subsequently appear, the invention resides in the parts, and in the construction, combination and arrangement of parts described, by way of example, in the following specification of certain presently preferred embodiments of the invention, reference being had to the accompanying drawings which form a part of said specification and in which drawings:

FIGS. 1, 2 and 3 are, respectively, top plan, side elevational and bottom plan views of a mold constituting a first embodiment of the invention, the illustrated mold being for use in a machine in which the ejector half of the mold moves horizontally toward and away from the cover half of the mold, FIG. 4 is an end elevation of the rear face of the cover half of the die shown in the preceding figures, FIG. 5 is an end elevational view of the rear face of the ejector half of the die as viewed on the sectional line 5—5 of FIG. 1 which extends between the ejector half and the ejector pin operating means, FIG. 6 is an enlarged scale elevational view of the rear face of the ejector die base taken on the line 6—6 of FIG. 1, FIG. 7 is an enlarged scale elevational view of the rear face of the cover die base as taken on the line 7—7 of FIG. 1, FIG. 8 is a plan view of the mold cavity face of the ejector half of the die shown in the preceding figures, FIG. 8a is a perspective view of a casting including runners, gates and overflow pads as removed from the mold shown in FIG. 8, the casting, per se, being indicated in heavier lines than the parts which are broken off and discarded, FIG. 9 is a fragmentary sectional view through the entire mold taken on the plane of the staggered line 9—9 of FIG. 7, FIG. 10 is a sectional view through the entire mold taken on the plane of the line 10—10 shown in FIGS. 6, 7 and 8, FIG. 10a is a fragmentary sectional view of the entire mold taken on the plane of the line 10a—10a of FIG. 8, FIG. 11 is a fragmentary sectional view of the entire mold taken on the plane of the line 11—11 of FIG. 7, FIG. 12 is a fragmentary plan view of the face of the ejector die portion of a mold embodying the invention and showing particularly the application of the principles of the invention to a laterally movable core element of the mold, FIG. 13 is a fragmentary sectional view taken on the line 13—13 of FIG. 12, FIG. 14 is a reduced scale, fragmentary, side elevational view of the right hand side of the mold shown in FIGS. 12 and 13 and particularly showing details of the actuating means for the laterally moving core element, and FIG. 15 is a fragmentary view like FIG. 5, but showing the addition of a vacuum switch and associated means.

In all of the foregoing figures in which cavity space for receiving molten material is shown, said space is shown as being filled with the injected material. Also, while as before noted, molds of this character are ordinarily employed in machines in which the movable or ejector die half moves toward and away from the cover half are arranged so that the dies move horizontally, some machines move vertically. Accordingly, where such terms as "top," "bottom," "above," "below," etc., it will be understood that such reference is made with respect to molds employed in a horizontal machine.

Before proceeding with a description of the features of the present invention, molds of the character with which the present invention is concerned will first be described in general terms as to those components which are usual in such molds. These molds are formed from metal and comprise a stationary or cover die and a movable or ejector die which are also sometimes known, respectively, as the cover half and ejector half. The meeting faces of the dies are suitably contoured to form the space into which the molten material is injected to form the desired casting or castings as well as the various gates, runners, overflow pockets and the like necessarily associated therewith. The cover die is mounted on the stationary platen of a suitable press mechanism and the ejector die is mounted on the moving platen of the press mechanism and is moved by that platen (usually by fluid pressure means) into and out of operative engagement with the cover die. As has been previously mentioned, most presses for such molds are arranged for horizontal operation of the ejector die, and as the description of the examples of the invention proceeds, it will be seen that the invention is adapted for use in either horizontally or vertically operating presses.

*Mold cavity, gate and runner*

Having reference to FIGS. 1–11, the mold illustrated and to which the present invention is applied, comprises the ejector die mold base 1 formed of steel and having a rhomboidal cavity formed in one face thereof in which die blocks 2 and 2' of tool steel are secured by screws 3 and 3' as will presently be described in more detail. The cover die similarly comprises a steel base 4 in which tool steel die blocks 5 and 5' are similarly secured by screws 6 and 6'. The cover die base at the corners thereof carries forwardly projecting guide pins or bars 7 fixed thereto and disposed parallel to each other and to the line of movement of the ejector die and which slidingly engage bores 7' in the ejector die as it moves toward the cover die thereby insuring alignment of the dies with each other. Molten material is supplied under pressure through a passage 8 in the cover die by applied pressure and is caused to flow into the cavity or cavities formed by the dies; said passage, for convenience, being hereinafter designated as the "sprue hole." The molten material receiving cavity of the mold, other than the sprue hole 8 includes a main runner channel 9 leading from a recess 8' formed in the die block 2' opposite the sprue hole 8, thence past a runner stop means forming a part of the present invention hereinafter to be described, and thence extending to the semicircularly extending branch runner 10 connected to the casting forming mold cavity 11 by gates 12. It will be understood that aside from the first portion of the runner, the shape of the cavity will vary according to the design of the part or parts to be produced. At the side of the illustrated cavity 11, remote from the metal entrance side thereof, three gates 13 connect the cavity 11 to three overflow pockets 14 also to be described in more detail.

Referring momentarily to FIG. 8a for convenience in identification, the portions of the molded article are indicated by the numbers which identify the portions of the cavity by which such portions were formed with the addition of the exponent "'." For example, the casting 11' is formed by the cavity 11 and the overflow pads 14' are formed in the overflow pockets 14, etc.

The illustrated casting 11' is formed with a central opening 15' formed by the core element 15 which is carried by the ejector die and which cooperates with a tapered opening 16 formed in the die block 5 and extending through the die block to form a breather of the type described and claimed in my said patent and communicating with an axiallly aligned bore 16a which extends through the die base 4. Similar breather devices 17 are associated with the ends of the runner 10 and the overflow pockets 14 and similarly extend to the rear face of the cover die base 4, said other breathers comprising replaceable core elements 18 carried by the ejector die blocks and replaceable cooperating sleeve elements 19 carried by the cover die and shown by way of example in FIG. 9, the central openings 20 of said sleeve elements being aligned with bores 20' extending to the rear face of the cover die base 4 and corresponding in function to the opening 16 previously referred to. The opening 16a and all but one of the openings 20' are connected by channels 21 formed by grooves in the rear face of the cover die base 4 and the overlying backing plate 22 secured thereto by screws 23 and forming these grooves into closed channels connecting the breather openings to a duct 24 extending from a bore 24' forming a junction with all of the channels 21 to a jet pump means 25 which may be like that employed in my said prior patent and which serves to evacuate the molten material receiving cavity. The remaining breather bore 20' is separately connected to a vacuum gage or to a vacuum switch as will be presently described.

Additionally, the usual ejector pins 26 are carried by the ejector plate assembly 27 associated with the ejector die and the ejector plate assembly is given the necessary movements relative to the ejector die to cause the ejector pins to be retracted during a casting or molding operation and to be projected into the mold cavity upon separation of the dies to dislodge the casting, such relative movement being imparted by any of the various modes usually employed for that purpose.

As thus far described, the mold without the further improvement of my invention will operate better than any conventional mold provided with the heretofore commonly used side vents in the meeting faces of the die but when a mold is subjected to the degree of evacuation which the means of my said prior patent is capable, due to the fact that air can always enter the mold cavity through spaces between the ejector pins and the bores in which they reciprocate when the cavity is subjected to negative pressure as well as the air which is present in the sprue hole prior to making a shot, the degree of evacuation of the mold cavity is limited and can be increased only if suitable sealing means can be achieved.

It is known that some attempts have been made to achieve a sealing on the meeting faces of the dies of a mold by the employment of gaskets and by the use of gasket devices around ejector pins but neither of these proposals has resulted in adoption by the art generally for the reason that they have not been found to be practical. The present invention proposes the interposition of zones of vacuum between the exterior of the mold and the mold cavity at all points where air might otherwise enter the mold cavity so that the employment of the evacuating means of my said prior patent can operate to achieve maximum evacuation of the mold cavity, per se, and that any possibility of air entering the cavity in response to the evacuation thereof is prevented.

The mold sealing means of the present invention will be considered under two subdivisions (a) the sealing at the meeting faces of the dies and (b) the sealing at the surfaces of mold components which have relative movement to each other accompanied with simultaneous movement of such components with at least one of the dies as, for example, the space between ejector pins and their guiding bores or between the relatively moving surfaces of a retractable core and the portion of a mold with which it has bearing engagement of a type affording access of air to the mold cavity.

*Die face sealing means*

The means for effecting sealing of the meeting faces of the dies comprises the provision of a shallow groove 30, preferably in the face surface of the ejector die block or blocks and disposed close to the edge of the die base cavity in which the die block component is contained, said groove comprising in the illustrated embodiment a top portion 31, parallel side portions 32, 32 and bottom portions 33, 33 which project toward each other in a horizontal plane containing the runner stop means, to be later described, and terminating short of said runner stop means. Extending from the rear faces of the die blocks 2 and 2' are breather core pins 34 projecting into and cooperating with the conical ends of breather bores 34' formed in replaceable sleeve elements 35 mounted in the die blocks 5 and 5' and axially aligned with bores 35' extending through the cover die base 4, the breathers formed by said core pins and sleeves being here shown as disposed at the corners of the groove 30 as well as at the mid-lengths of the portions 31 and 32 thereof, it being understood that this groove may be otherwise disposed dependent on the configuration of the cavity.

The rear face of the cover die base 4 is provided with grooves indicated by the numeral 36 which interconnect those of the breather bores 35' which extend along the left hand side of the mold as viewed in FIG. 7, with a duct 37 extending into the die block 5 and thence laterally out of the adjacent side of the die base, said duct exteriorly of the die base being connected to the inlet of a jet pump device 38. Additionally, a groove 39 connects the groove 36 with a counterbore surrounding the head of the one of the screws 6 which is adjacent both to the portions 31 and 32 and a second groove 40 similarly connects the groove 36 with the corresponding counterbores which surround the heads of the two screws 6 which secure the end of the die block 5 adjacent to the die block 5' while a third groove 41 connects the groove 36 with a counterbore surrounding the head of the adjacent one of the screws 6' which secures the die block 5' in the die base 4. At the right hand side of the rear face of the cover die base as viewed in FIG. 7, grooves 36', 39' and 41' similarly connect the adjacent bores 35' and the counterbores surrounding the heads of the screws 6 and 6' with a duct 37' and jet pump 38' with the addition of an extension to the groove 39' to connect it to the bore 35' at the center of the sealing groove portion 31.

By attachment of the backing plate 22, these grooves are connected into conduit means and by actuating the jet pumps 38 and 38' a vacuum is produced throughout the groove 30 wherefore, any air seeking to enter between the juxtaposed die faces is evacuated from the sealing groove before it can reach the mold cavity. This is obviously much better than the short-lived gaskets which (apart from shrouds) has been the manner most often employed in efforts to effectively seal the meeting faces of dies in order to evacuate a mold cavity.

To guard against the possibility that air might be caused to leak to the evacuated mold cavity by passing between the die blocks 5 and 5' and thence from between the die blocks to the mold cavity, the corners of the die blocks 5 and 5' at the juxtaposed rear faces of the blocks are slightly beveled as at 42 and each of the grooves 36 and 36' is connected by bores 43 and 43' with the interior of the die block cavity opposite the channel formed by the said adjacent beveled corners with the result that any air entering between the die blocks 5 and 5' and the cavity walls is evacuated by the jet pumps 38 and 38'.

Sealing ejector pin bores

Mention has been made of the fact that air can enter the mold cavity between the ejector pins which enter the mold cavity and the bearing surfaces for said ejector pins in the ejector die. To overcome this source of air leakage, the bore for each casting ejector pin 26 at the point of emergence therefrom from the rear face of the ejector die base is provided with a shallow counterbore 26'. Due to the possibility that some mishap may cause a flow of molten material into the sealing groove 30, each of the breather cores 34 associated therewith may, if desired, be accompanied by a pair of ejector pins 44 disposed one at each side thereof and said pins are operative in the event of metal or plastic entering the groove 30 to dislodge such material at the same time in the same manner as the casting ejector pins 26 eject the casting from the mold cavity. If these sealing groove ejector pins are employed, the bores in which they are guided at the point of emergence thereof from the rear face of the die base 1 may, if desired, be surrounded by shallow counterbores 44' similar to the counterbores 26'. Additionally, the heads of the die block securing screws 3 and 3' are surrounded by counterbores similar to the counterbores surrounding the corresponding screws 6 and 6' and all of these counterbores are connected by a series of grooves designated generally by the numeral 45 with a duct 46 extending into the die base and thence out of the die base at the top thereof and there being connected to a jet pump device 47. The said system of grooves 45 crosses the point of juncture of the die blocks 2 and 2' and at that point of intersection, a bore 48 extends through the back of the die base to the passage formed by the beveled edges of the die blocks 2 and 2' to afford a means of evacuating air from any space between the die blocks and the cavity in which they are disposed. The rear face of the ejector die base 1 is covered by a backing plate 49 secured thereto by screws 50 to convert the groove system and counterbores into a system of conduits through which the suction induced by the jet pump 47 serves to evacuate any air that might otherwise reach the mold cavity in response to the negative pressure in the cavity created by the suction of the jet pump 25. Thus, due to the fact that every possible source of air entering the mold cavity is guarded by evacuating means separate from the cavity evacuating means, the latter is able to develop a very high degree of evacuation in the mold cavity and this, in addition to assured filling of the mold cavity has other important advantages to be later discussed in detail.

Runner block means

As far as described, the mold evacuating means of the present invention has not taken into account the fact that the sprue hole and runner would be in connection with atmosphere and this would severely handicap the effectiveness of the jet pumps to evacuate the mold. To overcome this, the runner 9 adjacent to the recess 8' formed in the die block 2' is interrupted by a bore 51 of slightly greater diameter than the width of the runner and which extends at right angles to said runner through the die block 2' and die base 1. Closely slidable in the bore 51 is the runner block plunger 52 having a flat end surface 53 which engages the flat face of the opposing die block 5; said surface 53 being interrupted by a shallow channel 54 of modified sectoral configuration in plan and extending across the side of the plunger 52 facing the portion of the runner 9 which joins the sprue hole 8 and across the end of a breather channel, to be presently described, whereby the channel 54 serves to interconnect the runner 9 with that channel. The bore 51 at the back face of the die base 1 is provided with a counterbore 55 and a groove 56 connects this counterbore with the groove 45 to subject the counterbore 55 and the bore 51 to the evacuation effect of the jet pump 47.

The opposite end of the runner block plunger 52 extends to the adjacent face of the ejector plate assembly 27 and terminates in an enlarged flanged head 57 of non-circular peripheral configuration which is non-rotatably and slidably engageable in a corresponding opening 57' in the retainer plate component 58 of the ejector plate assembly. A cover plate 59 having a bore 60 in which the plunger 52 is slidable is secured to the retainer plate by screws 61 and a suitable compression spring 62 housed in and reacting between axially aligned bores 63 and 64 in the flanged end of the plunger and the backing plate 65 of the ejector plate assembly constantly urges the plunger away from the backing plate and the flanged head 57 thereof into engagement with the underside of the cover plate 59.

When the mold is closed, the runner block plunger 52 by its engagement with the die block 5 is pressed inwardly against the bias of the spring 62 sufficiently so that the flanged head 57 thereof is slightly spaced from the adjacent face of the retaining plate 59. In general practice this clearance is about 1/16" but may vary considerably according to the demands and requirements of molds for different castings. The spring 62 is of such strength as will not be able, as the mold is beginning to open, to start to dislodge the runner 9' from the runner 9 with possible cramping of the casting in the cavity and resulting damage to the ejector pin devices resulting from the cramping action. The strength of the spring is such as will cause the plunger 52 to follow the casting as it is moved out of the cavity by the ejector pins to the extent permitted by the flange 57 and retainer plate 59.

The channel 54 previously referred to in addition to extending across the runner 9 extends across a runner 66 extending laterally away from the plunger and the runner 9 to communicate with one side of a circular depression 67 in the die block 2'. A breather core 68 carried by the die block 2' is disposed in the center of the said depression and cooperates with a complementary tapered opening 69 in a replaceable sleeve 70 carried by the die block 6', said opening being aligned with a bore 69' extending through the die base 4. A separate groove 70 in the die base 4 extends from the bore 69' to a duct means 71 extending back into the die base and die block and thence to a jet pump means 72 at the top surface of the die base 4. Additionally, a pair of ejector pins 73, 73 are disposed at opposite sides of the breather core 68 and at the rear face of the die base 2 the bores in which said ejector pins 73 reciprocate are provided with counterbores 74 which are connected by a groove means 75 to the counterbore 55 and thus by the groove 56 to the jet pump 47. As has been previously noted, the backing plate 49 of the ejector die base forms all of these grooves into conduit means.

This breather may be merely left open to atmosphere or it may be connected to a jet pump device. Alternatively, it may be connected to a jet pump device which is left inactive. When the mold is used in connection with a hot chamber die casting machine, actuation of the jet pump operates to draw the metal from the gooseneck through the sprue hole and along the runner up to the runner block plunger 52 and thus prevents the intermixing of air in the sprue hole and runner with the advancing molten metal. In the case of a cold chamber die casting machine, the use of vacuum on this breather serves to remove the air as the shot cylinder pushes the metal toward and up to contact with the runner block plunger 52. The use of vacuum at this point is seldom, if ever, necessary in molds used for the injection molding of plastics.

Having reference to the above described mold and assuming that the mold as employed in a die casting machine, has been closed and is ready for a shot, the jet pumps 38 and 38' of the cover die and 47 of the ejector die are activated as is also the mold cavity evacuating jet pump 45. A vacuum gauge 76 mounted on the cover die is connected by a suitable duct means 77 to one of the breather bores 20' and when the machine operator observes from the gauge 76 that evacuation of the mold cavity has attained a certain predetermined value, he initiates the cycle of operation of the machine which usually proceeds automatically from initiation through steps comprising injection of the molten material, a delay of a predetermined time to allow the material to set, and the opening of the mold. Failure of the gauge to indicate the desired degree of evacuation is an indication that the mold is not properly closed and the operator can then take such steps to open the mold and clean the dies or whatever other steps may be necessary to eliminate the air leak that made it impossible to evacuate the mold cavity.

However, assuming that machine operation has been initiated by the operator, the machine shot plunger or piston forces the molten material into and through the sprue hole. In prior art molds, the air in the sprue hole was forced by the entering material into the mold cavity or cavities to be expelled therefrom by the molten material and such of the air as did not escape formed bubbles or other blemishes in the finished product. In the present invention, this air is blocked from entering the mold cavity by the runner block plunger 52 and is forced out through the runner block breather and thence through the duct means 71 and the jet pump 72 which serves the breather bore 69. This breather, like all of the breathers, is self-sealing by the congealing material as taught by my said prior patent. Thus, the air in the sprue hole is eliminated without having been allowed to enter the evacuated mold cavity.

As soon as the injected material reaches the runner block, the force of injection causes the molten material to displace the runner block plunger 52 and flow through runner 9 to fill the mold cavity and all of the associated metal receiving spaces until all of the associated breathers are sealed by the congealed material; it being borne in mind that from the instant of the beginning of the flow of metal into the sprue hole to the filling of the mold cavity takes place in a very short time interval—usually in considerably less than one second. This completes the casting operation except for opening of the mold (which generally occurs as an automatic portion of the machine operation cycle) and removal of the product from the open mold. The control of the machine may be so arranged (see FIG. 15) that upon initiation of a cycle by the operator causing closing of the mold and the subsequent evacuation of the mold cavity, a normally open, vacuum responsive switch means also connected with the vacuum gauge 76 to the mold cavity may be so adjusted that upon attainment of the desired predetermined degree of evacuation of the mold cavity, closing of the vacuum responsive switch means would initiate the rest of the cycle of operation of the machine including the injection of the material and opening of the mold.

This capability of thus employing the evacuation of the mold cavity as the basis for injection of the molten material makes possible the further refinement also shown in FIG. 15. In this figure, the vacuum responsive switch 95 is normally open and is closed in response to a predetermined vacuum in the mold cavity as previously described. The switch is interposed in the lead 96 extending from the manually operable starting switch 97 (the equivalent of which, in fully automatic machine controls, would be machine operated) to the machine cycle control means (not shown). A lead 98 extends from the lead 96 at the side of the vacuum switch means which is remote from the switch 97 to a pressure registry mechanism 99 and a counter 100, both of which may be selected from devices available on the open market and both of which operate once upon each impulse received by reason of the closing of the vacuum switch, a lead 101 serving to complete the circuits therethrough to the lead 102 of the machine control operating circuit. The registering mechanism is connected to the vacuum switch by suitable means, here shown as a dotted line 103, to control the pressure indicating means in the recording of the successive negative pressures on the chart means of the registering device. This may be either by current regulated by a variable resistance associated with the vacuum switch or the dotted line may be a conduit leading to vacuum responsive means in the recording device. Various components for these purposes are either obtainable in the open market as standard existing devices or such standard devices can be readily modified to suit the foregoing desired action.

This vacuum recorder means and counter means are employed only in the making of castings in which the strength factor and freedom of interior flaws is critical. In machines engaged in making such castings, the operator is accompanied by an inspector who examines each casting as it comes from the machine. Accordingly, the vacuum registering and counting devices are positioned at the bench at which the inspector works adjacent to the machine and as each casting comes from the machine he observes the vacuum condition at which the injection occurred and applies the shot number shown on the counting means to the casting which may be by wax pencil or a numbering stamp or any other suitable mode of marking.

Experiment with each individual mold for different types of castings will have determined for that particular mold the degree of evacuation below which at least inspection will be necessary and above which further critical inspection by X-ray or the like will be unnecessary. Such experiment will also disclose the extent of evacuation at which X-ray or other examination would be useless and the casting rejected. Thus this invention has the added and most important advantage of making it possible to maintain a degree of quality control in pressure die castings not heretofore possible. Still further, this improved quality control enables designers confidently to incorporate die castings for uses not heretofore believed to be practicable due to the unreliability of die castings not formed under the uniform and optimum conditions available by molds employing the present invention.

Finally, having reference to FIGS. 12, 13 and 14, there is shown a typical application of the principles of the invention to a mold having a separate core element moving in a direction other than the direction of movement of the ejector die toward and away from the cover die. In these figures, the parts which are generally similar to those previously described are identified by the same numbers as employed in the previous description thereof and will not be again described.

The side core here shown is one for forming a hole in the side wall surface of the casting which, as here shown for convenience, is otherwise like the casting shown in FIG. 8a. The side core comprises a cylindrical distal end portion 80 carried by a frustoconical body portion 81 which, in turn, is carried by a head component or portion 82 disposed outside of the die and is provided with opposed parallel ledges 82', 82' slidable in complementary grooves 83 in a supporting and guiding bracket element 84 carried by the outer side surface of the ejector die base 1. The adjacent side surface of the cover die base carries an angularly disposed bar or pin 85 having a head 86 at one end thereof secured to a side face of the cover die base 3 by screws 87, said bar being disposed at an acute angle to the direction of movement of the ejector die and engaging a complementary hole 88 in the head 82 so that movement of the ejector die toward the cover die moves the core inwardly with respect to the mold cavity and movement of the ejector die to open position retracts the core element laterally back at least sufficiently far so that it is out of the side surface of the mold cavity to permit removal of the casting therefrom.

As here shown, the portions of the core element end 80 and body 81 which are not contacted by the molten material are tightly engaged by complementary convex surfaces in the opposing die faces. To prevent air from entering the die cavity along the core element, it is sealed by a vacuum seal means comprising carrying the intersected portion of the seal groove portion 32 around one-half of the body portion 81 as at 90 and forming a complementary groove 91 in the cover half, said grooves forming an extension of the sealing groove system 31 served by the jet pump 47. Additionally, if desired or found necessary, a second sealing groove 92 may be formed in the die faces to be served either by a separate jet pump 93 connected thereto by a duct means as at 94.

The foregoing specific description of a mold for a specific die casting is by way of showing the application of the principles of the invention to an actual problem. Other forms of castings or plastic moldings would of course necessitate other die cavity breather arrangements and possibly other configurations of the vacuum sealing groove. The primary objective of the present invention is, of course, the novel concept of sealing the interengaging die faces to prevent the entry of air therebetween into the mold cavity by the novel expedient of providing means in those faces for evacuating any entering air before such air can reach the mold cavity wherefore, the mold cavity can be more surely and more completely evacuated without the necessity of the use of gaskets or an enclosing shroud device. Moreover, the invention also contemplates the evacuation of the sprue hole and runner as well as the mold cavity so that the entering molten material is not obstructed by the presence of air which it normally would have to push out of the mold cavity as the material entered that cavity and this, of course, includes the air which would otherwise normally occupy the sprue hole and the runner between the sprue hole and the mold cavity. Still further, any opportunity for air to enter the mold cavity along the ejector pins is also obviated. As in my said prior patent, the machine operator can be absolutely sure that before making a shot, the die is properly closed and is in proper condition to receive the molten material, an asssurance which has been lacking to all operators of die casting and injection molding machines heretofore.

While in the foregoing specification there has been disclosed certain presently preferred embodiments of the invention, such disclosure has been by way of example wherefore, it is not to be inferred therefrom that the invention is limited to the precise details thus shown by way of example and it will be understood that the invention includes as well all such changes and modifications in the parts and in the construction, combination and arrangement of parts as shall come within the purview of the appended claims.

I claim:

1. In a separable mold having a cavity into which molten material is to be injected under pressure, the combination of vacuum producing means carried by said mold and operative to evacuate the mold cavity, and other vacuum producing means carried by said mold operative to create zones of vacuum at every point on said mold between the exterior surface of the mold and the mold cavity at which, with the mold normally closed, air and gas could reach the mold cavity, whereby more complete evacuation of the mold cavity by said cavity evacuating means may be achieved.

2. A mold as claimed in claim 1 in which the mold comprises a cover die, an ejector die and in which said other vacuum producing means includes a channel formed in the face of at least one of the dies of said mold spaced from and substantially surrounding the perimeter of the mold cavity, and a vacuum creating means connected to and operative to maintain a vacuum in said channel when the mold is closed prior to and during the introduction of molten material into the mold cavity.

3. A mold as claimed in claim 2 in which said other vacuum producing means includes jet pump means carried by the cover die component of said mold and passage means extending between the intake of said jet pump means and a plurality of points along said channel whereby any air entering between the meeting faces of the dies is evacuated before reaching the mold cavity.

4. A mold as claimed in claim 1 in which said ejector die includes at least one reciprocable ejector pin and operating means therefor, in which said other vacuum producing means includes jet pump means carried by the ejector die of said mold, and intake means associated with said jet pump means and connected with the opening in the said ejector die in which said ejector pin is reciprocated whereby entry of air into the mold cavity between the ejector pin and the opening in which it reciprocates is prevented while said jet pump means connected to said opening is operating.

5. A mold as claimed in claim 1 in which said cover die includes a sprue hole having one end connected to a runner formed in the meeting faces of the mold and the other end connected to a source of molten material, in which a plunger intersects said runner, in which spring means normally positions said plunger to close said runner, in which an air and gas escape means is connected to said sprue hole and said runner upstream of said plunger, and in which the bias of the spring means holding said runner closed by said plunger is capable of being overcome by the pressure of the entering molten material with resultant entry of the molten material into the mold cavity without being preceded by entrapped air and gas.

6. A mold as claimed in claim 5 in which said air and gas escape means includes devices affording an opening of such reduced width as to permit the passage of air and gas but through which the molten material cannot pass, by reason of the physical properties thereof while molten.

7. In a separable mold having a cavity into which molten material under pressure is injected through a sprue hole, the combination of mold cavity evacuating means communicating with a portion of the mold cavity surface formed wholly on one of the dies comprising said mold, spring biased means interposed between the sprue hole and the mold cavity normally serving to prevent the entry of air and gas from the sprue hole into the mold cavity, air escape means interposed closely adjacent to and upstream of said spring biased means effective to dispose of air and gas expelled by the molten material advancing through said sprue hole, said spring biased means effective to dispose of air and gas expelled by the molten material advancing through said sprue hole, said spring biased means, serving first to direct air and gas received through the sprue hole to said air escape means and having a portion thereof engageable by the advancing molten material with resultant overcoming of the spring bias of said means and resultant flow of the molten material into the mold cavity.

8. A mold as claimed in claim 7 in which said mold includes a cover die, an ejector die having a plurality of ejector pins and a relatively movable plate for operating said ejector pins, in which said cover die includes a sprue hole, in which at least one of said dies includes a groove forming a runner leading to the mold cavity, and in which said spring biased means includes a plunger means normally interrupting said runner, said plunger means being reciprocable in said ejector die into and out of engagement with a surface of said cover die, and a compression spring reacting between said plunger element and said ejector plate to cause said plunger means to interrupt said groove.

9. A mold as claimed in claim 8 in which said plunger means includes a portion of the end thereof engageable with the cover die and a second portion on said end at the side of said plunger adjacent to the sprue hole which is spaced from the surface of the cover die sufficiently to afford an opening into which the molten material may enter and under the injection pressure imposed thereon, displace the pressure against the spring bias thereon so long as the molten material is flowing into the mold cavity.

10. A separable mold having a cavity into which molten material is to be injected under pressure, comprising a cover die and an ejector die, said cover die having a sprue hole and said dies when juxtaposed forming the mold cavity and runner means between said sprue hole and the mold cavity, means carried by said cover die operative to evacuate said mold cavity, means preventing the passage of air and gas from the sprue hole to said mold cavity, means operative to allow the escape of gas and air in the sprue hole to atmosphere as molten material advances therein while operative to prevent the passage of the molten material to atmosphere, and resilient means imposing a bias on said means for preventing the passage of air and gas from the sprue hole to said mold cavity effective in response to imposition of the pressure of the injected molten material thereon to allow momentary displacement of said means for preventing the passage of air and gas to said mold cavity with resultant entry of the molten material into the evacuated mold cavity.

11. A mold as claimed in claim 10 in which said means for preventing the passage of air and gas from the sprue hole to said mold cavity comprises a spring biased plunger means carried by said ejector die and positioned to interrupt said runner means and having an end surface normally engaging a complementary surface on the cover die.

12. In a separable die comprising a cover die and an ejector die, said dies having meeting faces which, when juxtaposed, combine to form a cavity into which molten material is to be injected under pressure, vacuum producing means carried by said cover die and operative to evacuate said mold cavity through air passage means emerging from a surface of said cover die other than the meeting face thereof, another vacuum producing means separately operative to create a zone of vacuum between said meeting faces of said dies and substantially surrounding said mold cavity, reciprocable ejector pin means carried by guide means in said ejector die and extending from an exterior surface of said ejector die to said mold cavity, and other vacuum producing means associated with said ejector pin means operative to prevent the entrance of air to said mold cavity through the clearance between said ejector pin means and said guide means therefor.

13. A separable mold comprising a cover die and an ejector die which, when juxtaposed, defines a cavity into which molten material is injected under pressure, means for evacuating said cavity through an orifice in a surface of said mold other than a meeting face of either of said dies, a core means carried by one of said dies and including a portion movable into and out of said cavity as said dies are juxtaposed to form said cavity or moved apart to remove a casting, said core means including a bearing portion slidingly engaging at least said one of said dies, means disposed exteriorly of said mold for imparting said movements to said core means, and evacuating means for creating a zone of vacuum between said bearing portion of said core means and the die surface engaged thereby.

14. A mold as claimed in claim 13 in which said vacuum zone creating means associated with said bearing portion of said core means additionally creates a zone of vacuum between the portions of the meeting faces of said dies spaced from and at least substantially surrounding the perimeter of the mold cavity.

15. In a separable mold having a cavity into which molten material is to be injected under pressure, the combination of vacuum producing means carried by said mold and including a connection to the interior of said mold cavity, said vacuum producing means being operative when the mold is closed and prior to the injection of molten material to effect evacuation of said mold cavity, and a vacuum responsive means having independent and direct communication with said mold cavity effective upon attainment of a predetermined degree of vacuum in said mold cavity to initiate the injection of molten material into said mold cavity.

16. In a separable mold having a cavity into which molten material is to be injected under pressure, the combination of vacuum producing means carried by said mold and connected to the interior of said mold cavity and being operative when the mold is closed and prior to the injection of molten material to evacuate said mold cavity, and vacuum responsive means having communication with said mold cavity effective upon attainment of a predetermined degree of vacuum in said mold cavity to initiate the injection of molten material into said cavity, said mold additionally including other vacuum producing means operative to create zones of vacuum at every point in said mold at which with said mold normally closed, air and gas might reach the evacuated mold cavity.

17. In a separable mold having a cavity into which molten material is to be injected under pressure, the combination of vacuum producing means carried by said mold and including a connection to the interior of said mold cavity, said vacuum producing means being operative when said mold is closed and prior to the injection of molten material to effect evacuation of said mold cavity, a vacuum responsive means having independent and direct communication with said mold cavity effective to initiate injection of molten material into said cavity upon attainment of at least a predetermined degree of evacuation in said mold cavity, and a recording means operatively associated with said vacuum responsive means effective at each initiation of injection of molten material into said mold cavity to record the degree of evacuation of the mold cavity at the instant of material injection.

18. In a separable mold having a cavity into which molten material is to be injected under pressure, the combination of vacuum producing means carried by said mold and including a connection to the interior of said mold cavity, said vacuum producing means being operative when said mold is closed and prior to the injection of molten material to effect evacuation of said mold cavity, a vacuum responsive means having independent and direct communication with said mold cavity effective to initiate injection of molten material into said cavity upon attainment of at least a predetermined degree of evacuation in said mold cavity, and a vacuum responsive gauge having separate communication with said mold cavity and further having indicating means visually denoting the degree of evacuation in said mold cavity.

19. In a separable mold having a cavity into which molten material is to be injected under pressure, the combination of vacuum producing means carried by said mold and including a connection to the interior of said mold cavity, said vacuum producing means being operative when said mold is closed and prior to the injection of molten material to effect evacuation of said mold cavity, a vacuum responsive means having independent and direct communication with said mold cavity effective to initiate injection of molten material into said cavity upon attainment of at least a predetermined degree of evacuation in said mold cavity, and a counting device operatively associated with said vacuum responsive means effective to indicate visually a number serving to identify the casting produced by the injection of molten material which was effected by said vacuum responsive means with concurrent actuation of said operatively associated counting device.

20. In a separable mold having a cavity into which molten material is to be injected under pressure, the combination of vacuum producing means carried by said mold and including a connection to the interior of said mold cavity, said vacuum producing means being operative when said mold is closed and prior to the injection of molten material to effect evacuation of said mold cavity, a vacuum responsive means having independent and direct communication with said mold cavity effective to initiate injection of molten material into said cavity upon attainment of at least a predetermined degree of evacuation in said mold cavity, a recording means operatively associated with said vacuum responsive means effective at each initiation of injection of molten material into said mold cavity to record the degree of evacuation of the mold cavity at the instant of material injection, and a counting device operatively associated with said vacuum responsive means effective to indicate visually a number serving to identify the casting produced by the injection of molten material which was effected by said vacuum responsive means with concurrent actuation of said operatively associated counting device.

References Cited

UNITED STATES PATENTS 3,108,339   10/1963   Bucy ---------------- 18—42

J. HOWARD FLINT, Jr., *Primary Examiner.*